Aug. 22, 1944.                R. D. GRAY ET AL                2,356,314

SCALING TOOL

Filed Nov. 23, 1942

INVENTORS
Reo D. Gray
James R. Denison
BY
ATTORNEY

Patented Aug. 22, 1944

2,356,314

UNITED STATES PATENT OFFICE 2,356,314

SCALING TOOL

Reo D. Gray and James R. Denison, Portland, Oreg., assignors of one-fourth to C. W. West and one-fourth to Andy Barbour, both of Portland, Oreg.

Application November 23, 1942, Serial No. 466,704

11 Claims. (Cl. 29—81)

Our invention relates to a tool for scaling welded joints, painted surfaces and for similar uses where it is desirable to chip free, and knock loose chips or flakes of material. It is essential that said flakes of material be disengaged from a surface by a relatively sharp blow, but said blow shall not be severe enough to damage the surface from which they are removed. In welding, for example, flakes of material are formed over a welded joint, which are not fluxed to the joint but are secured thereto rather tightly. Said scale is an undesirable, foreign body which must be removed before the welded joint can be painted or otherwise protected against rust or corrosion. It is common practice to perform such scaling operation with a lightweight pointed hammer. The workman strikes a relatively light tapping blow on the scale to break it loose without affecting the underlying surface. This is a tedious and time-consuming job and frequently the scale is formed upon an inaccessible place which is difficult to work upon. It is common practice to use pneumatic and electric hammers for chipping material free, but such types of hammers are not available for scaling operations because the chipping tools strike too heavy a blow, not only because the tools are driven directly by the hammering action of a plunger or piston, but also, because said tools are relatively massive and strike too severe a blow when they are struck by said plunger or piston.

We have discovered that, if relatively lightweight tools are provided, which are slidably mounted in a holder and are driven forwardly by a sharp blow so as to slide in said holder, that the sharpness of the blow may be used to perform the scaling operation without injuring the underlying surface. That is, we provide a lightweight cutting tool preferably comprising a plurality of members arranged in grouped relation. Said lightweight scaling tools are slidably mounted in a holder and extend to a chamber in said holder, and provide a slidable piston which may strike the ends of the scaling tools and drive them forward. Said driving plunger which strikes the ends of said scaling tools is restricted from moving forward with the scaling tools until the latter reach the outermost point and thus the scaling action is performed by said tools as they are driven forward by a sharp blow after they leave contact with the plunger which drives them forward, and the plunger is prevented from transmitting its blow through the scaling tools because its path is restricted to a point short of the point of outermost travel of said scaling tools.

The details of our invention are hereinafter described with reference to the accompanying drawing in which.

Figure 5:
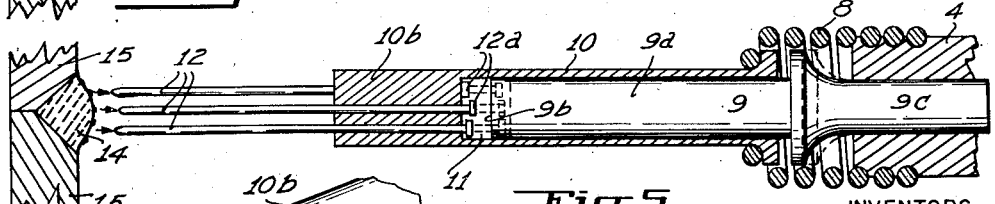
Figure 6:
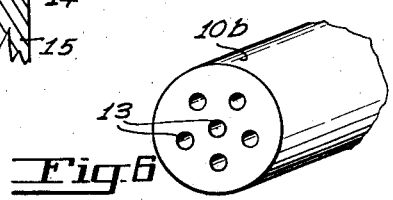

Fig. 5 is a similar sectional view diagrammatically illustrating the manner in which said scaling members bounce back off of the surface and move into the chamber in the holder and are struck by the end of the piston portion of said body or holder to again be driven forward; and Fig. 6 is a fragmentary view of the end of the cylinder body portion in which the scaling members are slidably mounted illustrating one grouped arrangement of apertures.

Figure 1:
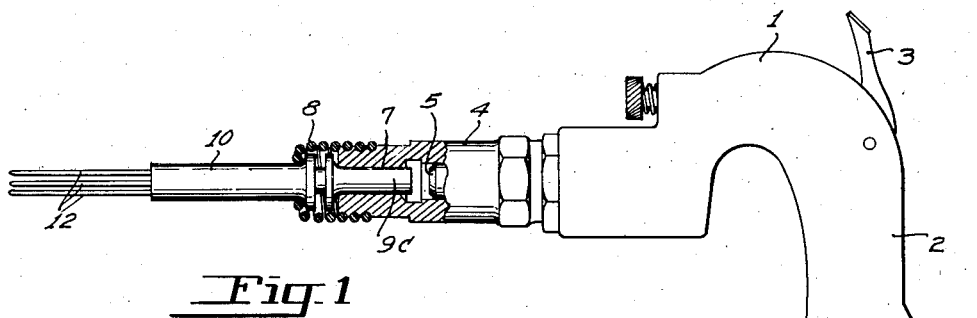
Fig. 1 depicts a more or less standard type of pneumatic hammer with a tool embodying our invention shown seated therein.
Figure 2:
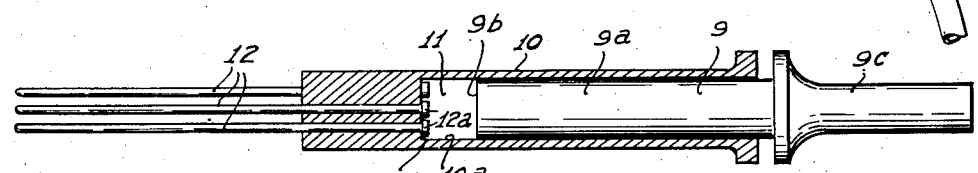
Fig. 2 is a longitudinal sectional view through said tool showing the two parts thereof spaced apart slightly and with the plural scaling tools shown at the point of outermost travel.

A scaling tool embodying our invention is adapted to be used with a hammering tool such, for example, as a pneumatic hammer 1 illustrated in Fig. 1. Such hammer comprises a grip 2 and a trigger 3, mounted therein and has a barrel 4 extending therefrom. Piston or plunger 5 is mounted for reciprocation in said barrel, being driven backward and forward by air admitted into control mechanism in the grip and barrel through an airhose 6. Our invention is not to be deemed limited to this particular pneumatic tool but is adapted to be used in connection with any type of hammer adapted to strike a series of sharp blows. The general type of hammer illustrated is an Ingersoll-Rand lightweight pneumatic hammer. It is common practice to provide hammers of this character, adapted to use any of a number of shanked tools, and to this end the barrel is provided with a tool receiving socket 7, adapted to have the shank of a tool seated therein.

We have shown a retainer or clip 8 which engages the barrel and tends to seat a tool tightly in place in said socket. Said retainer or clip is adapted to elongate to permit the tool to be driven outwardly but its resiliency tends to return said tool so that it fits tightly in the socket.

Figure 3:
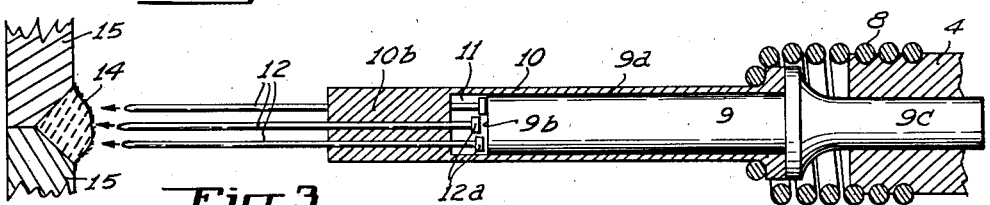
Fig. 3 is a more or less diagrammatic view showing the end of the barrel of the pneumatic tool, a holding clip thereon and a tool embodying our invention illustrating the position of the parts when the plural scaling tools are driven forward by a sharp blow of the piston half of the body or holder, said plural scaling tools being slidably mounted in the cylinder portion thereof.

A tool embody our invention is preferably made in two pieces, a shanked piston portion 9 and a flanged cylindrical portion 10. The portion 9 has an elongated end 9a which has a sliding fit in the bore 10a of the flanged cylindrical portion 10. The length of the elongated end 9a is less than the length of the bore 10a and when the piston portion is inserted as far into the cylindrical portion of the body as is shown in Fig. 3, a chamber 11 remains, spacing the head 9b of the shanked piston portion from the end 10b of the bore. Slidably mounted in said end 10b are scaling elements 12. We preferably provide a plurality of these scaling elements and arrange them to be freely slidable in apertures 13, formed in the head 10b. Said scaling elements preferably have enlarged heads 12a formed at one end thereof which heads lie in the chamber 11 and prevent the scaling elements from being disengaged from the apertures 13, unless they are backed out after the piston is removed from the cylinder. Said scaling elements preferably are made of drill rod or similar hard, tough, elastic steel and are relatively small gauge. We have illustrated how six of said scaling elements can be arranged in concentric pattern extending longitudinally from the head 10b of the flanged cylindrical portion 10. When the chamber is contracted to its smallest compass, as is shown in Fig. 3, there still remains a substantial space in which said heads may move and when the piston is retracted, as is shown in Fig. 4, they may move to a greater degree.

Figure 4:
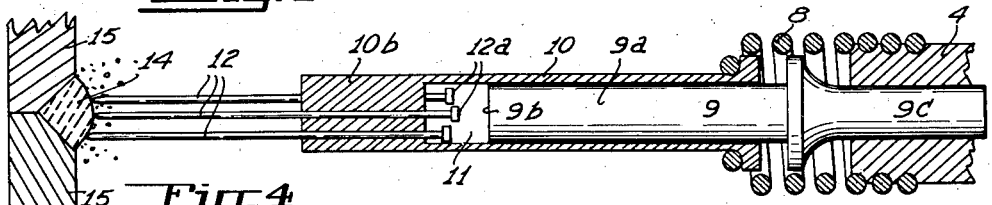
Fig. 4 is a view similar to Fig. 3, illustrating the manner in which the parts are arranged when said scaling tools are struck sharply and driven forwardly to strike the surface being scaled to knock off chips of scale.

The flanged cylindrical portion 10 is adapted to be engaged by the retainer or clip 8 which tends to pull the members 9 and 10 towards the right, as viewed in Figs. 3 to 5, inclusive. Thus, the shank 9c of the piston portion is seated in its entirety in the socket 7 so that it will be struck by the end of the piston or plunger 5 in the barrel of the pneumatic hammer, in the manner shown in Fig. 1. The striking blow by the piston or plunger 5 upon the end of the shank piston portion 9 of the tool holder will tend to drive said portion 9 outwardly and to carry with it the flanged cylindrical portion 10 and this will elongate the spring in the manner shown in Figs. 3 to 5, inclusive. The retainer or clip 8 will tend to pull said members 9 and 10 back into their original position and with it will tend to pull the scaling elements 12 along therewith when the heads are engaged, as is shown in Fig. 5. When said parts 9 and 10 are seated in the socket, the freely slidable scaling members will continue to move until they are thrown against the head 9b of the shanked piston portion 9. Said shanked piston portion at such time probably will be again driven forward by the action of the plunger and the elasticity of the scaling elements and the shanked piston portion will cause said scaling elements to be driven sharply outwardly in the manner shown in Fig. 3 to repeat the cycle of operation.

It may be understood thus that the scaling operation is performed by driving the relatively lightweight scaling elements outwardly to direct sharp blows upon a surface to be scaled. The mass of the members 9 and 10, the plunger 5 and the entire pneumatic hammer are prevented from affecting the blow of the scaling elements because they are separated from the surface to be scaled and the only blow struck is the sharp blow of the scaling elements as they are driven forwardly indirectly by the blow of the piston or plunger 5. Although we deemed it desirable to provide a two-piece holder which may be accommodated by a standard pneumatic hammer because it is provided with a shank, it is also possible to have the plunger 5 or an extension thereof deliver the hammer-like blow on the ends of the scaling elements 12. This, however, would require the design and construction of a special pneumatic hammer and would not permit it to utilize pneumatic hammers as they are previously constituted.

That is, the shanked piston portion serves only as an intermediate agency to transmit the blow of the piston to the heads of the scaling elements 12. Said piston portion is shuttled back and forward by the stroke of the piston and elongation of the retaining clip 8 as it is supplemented by the blow struck by the rebounding of scaling elements 12 when they rebound off of the surface being scaled.

We have illustrated our scaling tool in connection with the scaling of welded joints. It possibly has an equally important field in the removal of thick coats of paint from surfaces. The effective blow of the scaling elements can be controlled not only by the intensity of a blow struck by the piston or plunger 5 but also may be controlled by varying the mass of the scaling elements 12. We deem it desirable that the scaling members be thoroughly lubricated so that they will float freely in the apertures 13 provided for them. This permits them to shuttle very quickly and prevents them from binding or sticking. If but one scaling element were used, then it could be used to clean off a path of minimum width while if a plurality are provided in group relation a substantial area can be cleaned, such, for example, as the width of a welded seam 14, between two plates 15. In other words, the grouped scaling elements can be used for scaling all or a substantial portion of the welded joint at one time. The scaling elements do not operate together as a unit but each has its own periodic vibration depending upon the manner in which the springs retract it, the plunger strikes it and the rebound of each of said scaling elements from the surface being scaled.

We claim:

1. A scaling tool comprising a holder adapted to be operatively seated in a reciprocating hammer mechanism, and a plurality of freely movable scaling members of slight mass slidably mounted in said holder and extending longitudinally therefrom, and means arranged within said holder for striking the ends of said scaling members a sharp blow periodically to drive them outwardly from said holder.

2. A scaling tool adapted for use with a reciprocating hammer, comprising a two-piece body and a plurality of grouped lightweight scaling members slidably mounted therein, said body having a central chamber formed therein, one of said body pieces constituting a cylinder member and the other a piston adapted to reciprocate therein, said scaling members being positioned and arranged to be struck by the latter body piece as it reciprocates relatively in the first mentioned piece to drive said members outwardly from said chamber.

3. A scaling tool adapted for use with a reciprocating hammer, comprising a two piece body and a plurality of grouped lightweight scaling members slidably mounted therein, said scaling members having heads formed upon one end thereof, said body having a central chamber formed therein, said heads of the scaling members lying in said chamber, one of said body pieces constituting a cylinder member and the other a piston adapted to reciprocate therein, said scaling members being positioned and arranged to be struck by the latter body piece as it reciprocates relatively in the first mentioned piece to drive said members outwardly from said chamber.

4. A scaling tool adapted for use with a hammer mechanism including a barrel having a plunger adapted for reciprocation therein and a tool holding recess leading into said barrel, said tool being provided with a shank adapted to seat in said recess, said tool comprising a chambered body having a plurality of lightweight scaling members slideably mounted for reciprocation in said body, and means in said body for striking the ends of said members sharp hammer blows, said means being movably mounted in said body.

5. A scaling tool adapted for use with a hammer mechanism including a barrel having a plunger adapted for reciprocation therein and a tool holding recess leading into said barrel, said tool being provided with a shank adapted to seat in said recess, said tool comprising a chambered body having a plurality of lightweight scaling members slidably mounted for free reciprocation in said body, and means in said body for striking the ends of said members sharp hammer blows, said means being movably mounted in said body.

6. A scaling tool adapted for use with a hammer mechanism including a barrel having a plunger adapted for reciprocation therein and a tool holding recess leading into said barrel, said tool being provided with a shank adapted to seat in said recess, said tool comprising a chambered, elongated body having a plurality of elongated lightweight scaling members extending longitudinally of said body and slideably mounted for reciprocation in said body, and means in said body for striking the ends of said members sharp hammer blows, said means being movably mounted in said body.

7. A scaling tool adapted for use with a hammer mechanism including a barrel having a plunger adapted for reciprocation therein and a tool holding recess leading into said barrel, said tool being provided with a shank adapted to seat in said recess, said tool comprising a chambered body having a plurality of lightweight scaling members arranged in grouped relation and slideably mounted for reciprocation in said body, and means in said body for striking the ends of said members sharp hammer blows, said means being movably mounted in said body.

8. A scaling tool adapted for use with a hammer mechanism including a barrel having a plunger adapted for reciprocation therein and a tool holding recess leading into said barrel, said tool being provided with a shank adapted to seat in said recess, said tool comprising a chambered, two-piece body having a plurality of lightweight scaling members adapted for reciprocation in said body, said body pieces being slidably mounted one in the other.

9. A scaling tool adapted for use with a hammer mechanism including a barrel having a plunger adapted for reciprocation therein and a tool holding recess leading into said barrel, said tool being provided with a shank adapted to seat in said recess, said tool comprising a chambered, two-piece body having a plurality of lightweight scaling members adapted for reciprocation in said body, said body pieces being slidably mounted one in the other, said scaling members being slidably mounted in one piece of said body, extending into the chambered portion of said body and adapted to be struck periodically by the end of the other body piece to drive said scaling members outwardly from said chamber.

10. A scaling tool comprising a pneumatic hammer mechanism including a barrel having a plunger adapted for reciprocation therein and a tool holding recess leading into said barrel, said tool being provided with a shank adapted to seat in said recess, resilient means adapted to engage said tool and tending to hold the shank thereof seated in said recess, said tool comprising a chambered body having a plurality of lightweight scaling members adapted for free reciprocation in said body.

11. A scaling tool comprising a pneumatic hammer mechanism including a barrel having a plunger adapted for reciprocation therein and a tool holding recess leading into said barrel, said tool being provided with a shank adapted to seat in said recess, a coiled spring retaining clip adapted to engage said tool and tending to hold the shank thereof seated in said recess, said tool comprising a chambered body having a plurality of lightweight scaling members adapted for free reciprocation in said body.

REO D. GRAY.
JAMES R. DENISON.